United States Patent
Stoesz et al.

(10) Patent No.: US 9,255,822 B2
(45) Date of Patent: Feb. 9, 2016

(54) SPLICABLE FIBER OPTIC SENSING SYSTEM, METHOD OF MAKING SAME AND TAPE FOR SENSE TRANSMISSIVELY LOCKING AN OPTICAL FIBER

(71) Applicants: Carl W. Stoesz, Blacksburg, VA (US); Brooks A. Childers, Christiansburg, VA (US)

(72) Inventors: Carl W. Stoesz, Blacksburg, VA (US); Brooks A. Childers, Christiansburg, VA (US)

(73) Assignee: Baker Hughes Incorporated, Houston, TX (US)

( * ) Notice: Subject to any disclaimer, the term of this patent is extended or adjusted under 35 U.S.C. 154(b) by 5 days.

(21) Appl. No.: 14/169,760

(22) Filed: Jan. 31, 2014

(65) Prior Publication Data

US 2015/0219476 A1    Aug. 6, 2015

(51) Int. Cl.
| | |
|---|---|
| *G02B 6/00* | (2006.01) |
| *G01D 5/353* | (2006.01) |
| *G01L 1/24* | (2006.01) |
| *B32B 37/12* | (2006.01) |
| *B32B 37/14* | (2006.01) |
| *C09J 7/02* | (2006.01) |
| *C09J 163/00* | (2006.01) |
| *C09J 7/04* | (2006.01) |

(52) U.S. Cl.
CPC ........ *G01D 5/35374* (2013.01); *B32B 37/1292* (2013.01); *B32B 37/142* (2013.01); *C09J 7/02* (2013.01); *C09J 7/04* (2013.01); *C09J 163/00* (2013.01); *G01L 1/242* (2013.01); *C09J 2201/122* (2013.01); *C09J 2201/28* (2013.01); *C09J 2400/263* (2013.01); *C09J 2463/00* (2013.01)

(58) Field of Classification Search
CPC ........ G01L 1/246; G02B 6/022; G01H 9/004; G01D 5/35303
USPC ........................................ 385/13, 15, 39, 95
See application file for complete search history.

(56) References Cited

U.S. PATENT DOCUMENTS

| | | | | |
|---|---|---|---|---|
| 6,014,487 | A * | 1/2000 | Field | G02B 6/4407 |
| | | | | 385/102 |
| 6,104,846 | A * | 8/2000 | Hodgson | G02B 6/2551 |
| | | | | 385/12 |
| 6,181,857 | B1 | 1/2001 | Emeterio et al. | |
| 6,574,400 | B1 | 6/2003 | Lail | |
| 2001/0043781 | A1 | 11/2001 | Yokokawa et al. | |
| 2010/0142903 | A1 | 6/2010 | Dowd | |

FOREIGN PATENT DOCUMENTS

| | | |
|---|---|---|
| EP | 1942321 A1 | 7/2008 |
| EP | 1942324 B1 | 4/2012 |

OTHER PUBLICATIONS

Notification of Transmittal of the International Search Report and the Written Opinion of the Internatuional Searching Authority, or the Declaration; PCT/US2014/071495; Mailed Apr. 14, 2015; 9 pages.

* cited by examiner

*Primary Examiner* — Jennifer Doan
(74) *Attorney, Agent, or Firm* — Cantor Colburn LLP

(57) ABSTRACT

A splicable fiber optic sensing system includes, a core, a sheath surrounding the core, an adhesive disposed between the core and the sheath at some locations and not at other locations, and at least one optical fiber disposed between the core and the sheath being sense transmissively locked to the core by the adhesive at the locations containing the adhesive.

17 Claims, 3 Drawing Sheets

SPLICABLE FIBER OPTIC SENSING SYSTEM, METHOD OF MAKING SAME AND TAPE FOR SENSE TRANSMISSIVELY LOCKING AN OPTICAL FIBER

BACKGROUND

Cables, particularly fiber optic cables, are used ubiquitously in the downhole drilling and completions industry. These cables are used for monitoring a variety of downhole conditions and parameters, such as temperature, vibration, acoustic energy, pressure, strain, etc. Due chiefly to their pervasive use, there is an ever-present desire in the industry for alternate configurations of sensing cables, particularly for enhancing the ability to connect separate sensing cables to one another.

BRIEF DESCRIPTION

Disclosed herein is a splicable fiber optic sensing system. The system includes, a core, a sheath surrounding the core, an adhesive disposed between the core and the sheath at some locations and not at other locations, and at least one optical fiber disposed between the core and the sheath being sense transmissively locked to the core by the adhesive at the locations containing the adhesive.

Further disclosed herein is a method of forming a splicable fiber optic sensing system. The method includes, positioning at least one optical fiber in an annular space defined between a core and a sheath, and bonding the at least one optical fiber to at least one of the core and the sheath with an adhesive in some locations while not bonding the at least one optical fiber to at least one of the core and the sheath at other locations.

Further disclosed herein is a tape for sense transmissively locking an optical fiber to a member. The tape includes, a support member and adhesive that is adhered to some portions of the support member and not adhered to other portions of the support member.

Further disclosed herein is a tape for sense transmissively locking an optical fiber to a member. The tape includes, a plurality of support members, adhesive that is adhered to the plurality of support members, and a strip that is connected longitudinally to ends of two of the plurality of support members positioned adjacent one another.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
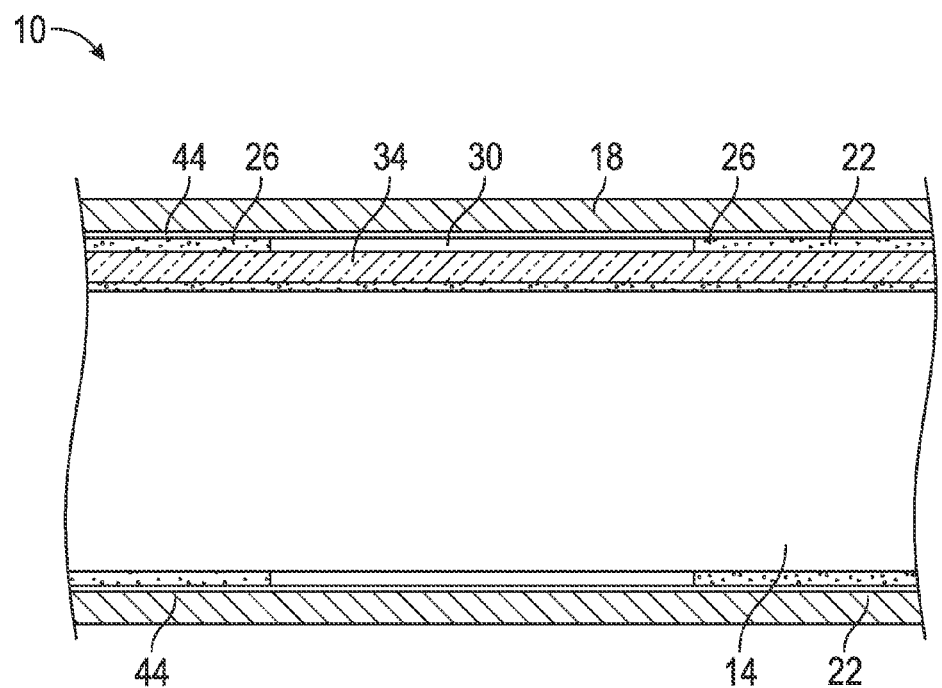
FIG. 1 depicts a side cross sectional view of a splicable fiber optic cable sensing system disclosed herein taken at arrows 1-1 of FIG. 2.
Figure 2:
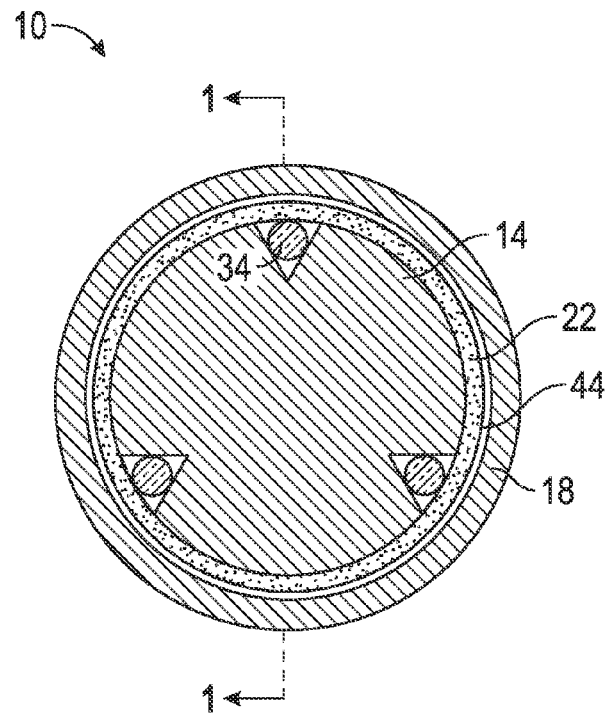
FIG. 2 depicts an end cross sectional view of a splicable fiber optic cable sensing system disclosed herein.

Referring to FIGS. 1 and 2, a splicable fiber optic sensing system is illustrated at 10. The system 10 includes, a core 14, a sheath 18 surrounding the core 14, an adhesive 22 disposed between the core 14 and the sheath 18 at some locations 26 and not at other locations 30, and at least one optical fiber 34, with three being shown in this embodiment, disposed between the core 14 and the sheath 18 being sense transmissively locked to the core 14 by the adhesive 22 at the locations 26 containing the adhesive 22. Optionally, in the locations 26, with the adhesive 22, the optical fibers 34 are also adhered to the sheath 18 by the adhesive 22 and the sheath 18 is adhered to the core 14 by the adhesive. Adhesions of each of these components to the other are sufficient to sense transmissively lock them together. Senses that can be transmitted by this locking include, for example, strain, pressure, temperature, acoustic energy, stress, vibration, and combinations thereof.

In this embodiment the locations 26, 30 are longitudinally displaced from one another, although other displacements are considered. In the locations 30, without the adhesive 22, the core 14, the sheath 18 and the optical fibers 34 are not adhered to one another. This is not to say that they are not sense transmissively locked to one another, as they still may be depending upon compressive loads and frictional engagement therebetween. Since there is not adhesion between the core 14, the sheath 18 and the optical fibers 34 in the locations 30, the optical fibers 34 are easily separable from the core 14 and the sheath 18 when, for example, a portion of the sheath 18 is cut away in the locations 30. This separating of the optical fibers 34 allows them to be easily spliced to another of the optical fibers 34. In conventional systems, that do not include the locations 30 without the adhesive 22, there is increased difficulty in splicing the optical fibers 34 due to potential damage to them while separating them from the core 14 and the sheath 18, since they are continuously adhered to the core 14 and the sheath 18 with the adhesive 22 over their entire length.

Figure 3:
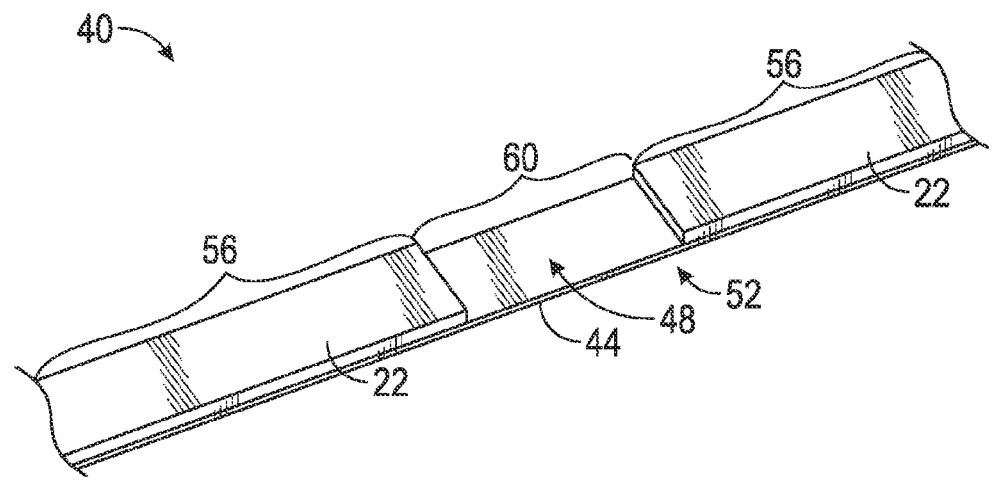
FIG. 3 depicts a partial perspective view of a tape usable in the splicable fiber optic cable sensing system of FIG. 1.

Creating the locations 26, 30 in the system 10 is facilitated by the use of tape 40, as illustrated in FIG. 3, reference to which follows. The tape 40 includes a support member 44 and the adhesive 22. The support member 44 is elongated and flat such that it has a first side 48 that opposes a second side 52 thereof. The adhesive 22 adheres to the support member 44 and more of the adhesive 22 is positioned on the first side 48 than on the second side 52. In this embodiment the support member 44 is scrim which is porous by its nature. As such, some of the adhesive 22 is able to travel through the porosity of the support member 44 thereby leaving some of the adhesive on the second side 52 even though the adhesive 22 is originally only applied to the first side 48. Having some of the adhesive 22 on both sides 48, 52 of the support member 44 allows some of the adhesive 22 to contact and thus bind with the sheath 18. The adhesive 22 however is not applied to 100 percent of the first side 48 of the support member 44. Instead the adhesive 22 is only positioned and adhered to some portions 56 while not being positioned at and adhered to other portions 60 along a length of the support member 44.

Figure 4:
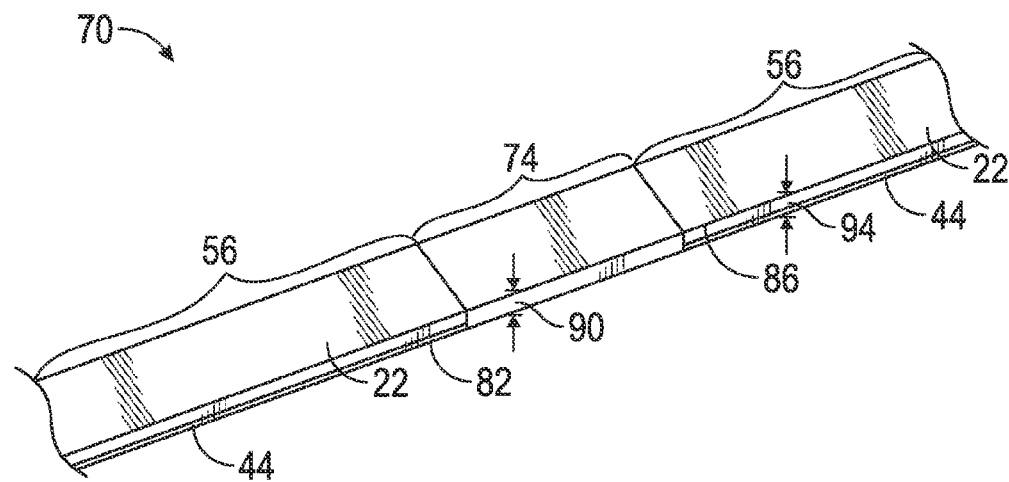
FIG. 4 depicts a partial perspective view of an alternate embodiment of a tape usable in the splicable fiber optic cable sensing system of FIG. 1.

Referring to FIG. 4, an alternate embodiment of tape for use in sense transmissively locking the optical fibers 34 (not shown in FIG. 4) to a member is illustrated at 70. The tape 70 is similar to the tape 40 at the portions 56 having the adhesive 22 adhered thereto. The tape 70 differs where there is not adhesive as in portion 74. A strip 78 is spliced into the tape 70 at portion 74. As such the strip 78 connects longitudinally adjacent ends 82, 86 of two of the support members 44 that are positioned longitudinally adjacent one another. A thickness 90 of the strip 78 in this embodiment is substantially the same as a thickness 94 of the support member 44 with the adhesive 22 adhered thereto as in the portions 56. The strip 78 in this embodiment is a polymer with structural properties similar to that of the support member 44 with the adhesive 22 attached to facilitate handling of the tape 70 such as during rolling and unrolling it and while applying it around the core 14. Polymers that are well suited for the strip 78 include, for example, polyimide and vinyl.

The adhesive 22 in embodiments disclosed herein can be an epoxy that is premixed and partially cured. The partial curing hardens the epoxy into a solid so that it can be more easily handled, such as by applying it to the support member 44 and rolling it into rolls. This hardened state is sometimes referred to as the B-stage. Increasing temperature of the B-stage epoxy causes it to melt thereby allowing it to bond to parts it is in contact with while aiding in the completion of curing of the epoxy.

The system 10 is employable in industries wherein it is used in an earth formation borehole. Such industries include the hydrocarbon recovery and carbon dioxide sequestration industries. Temperatures in such boreholes can reach into the hundreds of degrees which is sufficient to melt and finish curing of the B-stage epoxy. In such applications the system 10 can be applied along a tubular such as a tool string, a liner or a casing to sense parameters of the tubular.

Figure 5:
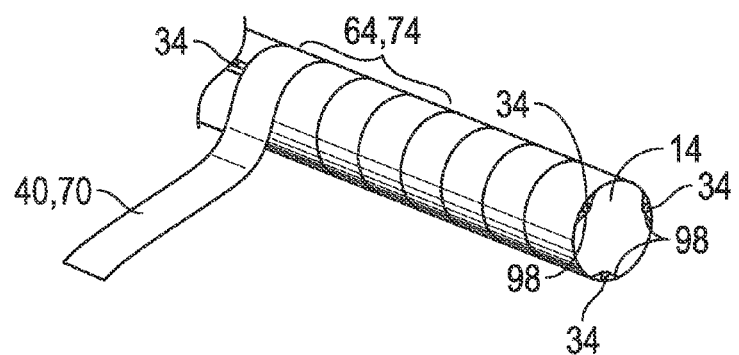
FIG. 5 depicts a partial perspective view of a partially assembled splicable fiber optic cable sensing system disclosed herein.

Referring to FIG. 5, the tape 40, 70 is shown while being applied to the core 14. The tape 40, 70 is helically wrapped around the core 14 after the optical fibers 34 are positioned along the core 14. It should be noted that the optical fibers 34 can be helically wrapped around the core 14 or can be run substantially parallel to the core 14. If the fibers 34 are run parallel to the core 14 use of three or more of the fibers 34 allows differential sensing between the fibers 34 to determine bending strain, for example. Optionally, regardless of how the optical fibers 34 are oriented relative to the core 14, the optical fibers 34 may be positioned within channels 98 formed in the core 14. Such channels 98 help to locate the optical fibers 34 prior to application of the tape 40, 70, for example. Regardless, of whether the channels 98 are employed the portions 60, 74 without the adhesive 22 provide a longitudinal section of the assembly that allows the sheath 18 to be removed and the optical fibers 34 to be easily separated from the core 14 and the sheath 18 (not shown in FIGS. 5 and 6) for splicing thereof.

Figure 6:
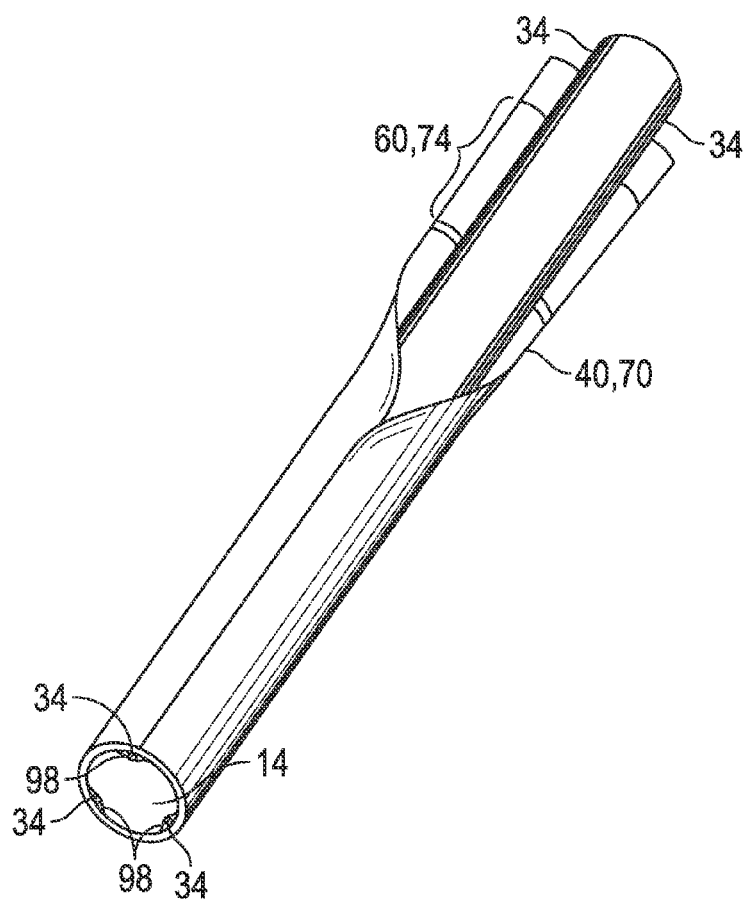
FIG. 6 depicts a partial perspective view of a partially assembled alternate embodiment of a splicable fiber optic cable sensing system disclosed herein.

Referring to FIG. 6, the tape 40, 70 is shown while being applied to the core 14 in an alternate fashion. In this embodiment the tape 40, 70 is rolled around the core 14, while the optical fibers 34 are positioned therealong in a fashion similar to paper being rolled around a cigarette.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A splicable fiber optic sensing system comprising:
   a core;
   a sheath surrounding the core;
   an adhesive disposed between the core and the sheath at some locations and not at other locations; and
   at least one optical fiber disposed between the core and the sheath being sense transmissively locked to the core by the adhesive at the locations containing the adhesive.

2. The splicable fiber optic sensing system of claim 1, wherein the senses that are transmissive through the sense transmissive locking include strain, pressure, temperature, acoustic energy, stress, vibration, and combinations of the foregoing.

3. The splicable fiber optic sensing system of claim 1, wherein the at least one optical fiber is helically wrapped around the core.

4. The splicable fiber optic sensing system of claim 1, wherein the at least one optical fiber is three optical fibers.

5. The splicable fiber optic sensing system of claim 1, wherein the adhesive binds the at least one optical fiber to the sheath.

6. The splicable fiber optic sensing system of claim 1, wherein the adhesive binds the sheath to the core.

7. The splicable fiber optic sensing system of claim 1, wherein the sheath is not bonded to the core at locations without adhesive.

8. The splicable fiber optic sensing system of claim 1, wherein the at least one optical fiber is not bonded to the core at locations without adhesive.

9. The splicable fiber optic sensing system of claim 1, wherein the at least one optical fiber is not bonded to the sheath at locations without adhesive.

10. The splicable fiber optic sensing system of claim 1, wherein the at least one optical fiber is easily separable from the core and the sheath in locations without adhesive.

11. The splicable fiber optic sensing system of claim 1, wherein the locations with the adhesive are longitudinally displaced from locations without the adhesive.

12. A method of forming a splicable fiber optic sensing system comprising:
    positioning at least one optical fiber in an annular space defined between a core and a sheath; and
    bonding the at least one optical fiber to at least one of the core and the sheath with an adhesive in some locations while not bonding the at least one optical fiber to at least one of the core and the sheath at other locations.

13. The method of forming a splicable fiber optic sensing system of claim 12, further comprising positioning adhesive in the locations where bonding of the at least one optical fiber to at least one of the core and the sheath is desired.

14. The method of forming a splicable fiber optic sensing system of claim 12, further comprising adhering the sheath to the core in locations where adhesive is positioned.

15. The method of forming a splicable fiber optic sensing system of claim 12, further comprising wrapping a film around the at least one optical fiber and the core prior to the sheath being applied therearround, the film including portions with adhesive and portions without adhesive.

16. The method of forming a splicable fiber optic sensing system of claim 15, further comprising wrapping the film helically around the core.

17. The method of forming a splicable fiber optic sensing system of claim 15, further comprising wrapping the film longitudinally around the core.

\* \* \* \* \*